United States Patent
Manico et al.

[11] Patent Number: 6,113,857
[45] Date of Patent: Sep. 5, 2000

[54] GAUGE TYPE TIME AND TEMPERATURE INTEGRATING INDICATOR DEVICE

[75] Inventors: Joseph A. Manico; Arunachalam T. Ram, both of Rochester, N.Y.; Fred R. Chamberlain, Encinitas, Calif.; Thierry Vachette, Esbarres, France

[73] Assignee: Eastman Kodak Corporation, Rochester, N.Y.

[21] Appl. No.: 08/987,559

[22] Filed: Dec. 9, 1997

[51] Int. Cl.⁷ ................................................. G01K 11/12
[52] U.S. Cl. .............................. 422/61; 422/57; 73/25.1; 73/61.74
[58] Field of Search .................. 422/56–58, 61; 73/25.1, 61.74

[56] References Cited

U.S. PATENT DOCUMENTS

| | | |
|---|---|---|
| 3,344,670 | 10/1967 | Olsen et al. . |
| 3,999,946 | 12/1976 | Patel et al. . |
| 4,382,700 | 5/1983 | Youngren . |
| 4,384,780 | 5/1983 | Bresson . |
| 4,469,423 | 9/1984 | Bresson . |
| 4,735,745 | 4/1988 | Preziosi et al. . |
| 4,737,463 | 4/1988 | Bhattacharjee et al. . |
| 4,812,053 | 3/1989 | Bhattacharjee . |
| 4,892,677 | 1/1990 | Preziosi et al. . |
| 4,917,503 | 4/1990 | Bhattacharjee . |
| 5,057,434 | 10/1991 | Prusik et al. . |
| 5,085,801 | 2/1992 | Thierry et al. . |
| 5,120,137 | 6/1992 | Ou-Yang . |
| 5,285,227 | 2/1994 | Lawther et al. . |
| 5,306,466 | 4/1994 | Goldsmith . |
| 5,499,597 | 3/1996 | Kronberg . |
| 5,667,303 | 9/1997 | Arens et al. . |
| 5,734,411 | 3/1998 | Michielsen et al. ............... 347/186 |

FOREIGN PATENT DOCUMENTS

| | | |
|---|---|---|
| 0 018424 | 11/1980 | European Pat. Off. . |
| 0 054 831 | 6/1982 | European Pat. Off. . |
| 1 284 361 | 8/1972 | United Kingdom . |
| 1 521 653 | 8/1978 | United Kingdom . |
| 2 199 981 | 1/1988 | United Kingdom . |
| 2 267 952 | 6/1993 | United Kingdom . |
| 96/28714 | 3/1996 | WIPO . |

OTHER PUBLICATIONS

"3M Monitor Mark™ Product Exposure Indicators" Technical Report, 1995.
"3M Monitor Mark™ High Temperature Labels" Data Page for High Temperature Labels 34AA and 42AA, 1995.
"Telatemp Custom Temperature Labels" and "Telatemp Irreversible Temperature Labels" data sheets, No Date Provided.

Primary Examiner—Lyle A. Alexander
Attorney, Agent, or Firm—Andrew J. Anderson

[57] ABSTRACT

A time and temperature integrating device for providing a visually observable indication of cumulative thermal exposure is disclosed comprising (a) at least two thermally sensitive image-forming areas of differing thermal sensitivity, and (b) indicating indicia in association with the thermally sensitive areas for indicating when each thermally sensitive area of the device has been exposed to predetermined cumulative thermal exposures. Such cumulative time-temperature exposure indicators may advantageously monitor and provide an ongoing record of thermal exposure prior to reaching a state of complete degradation, or other monitored property change, in an associated product.

20 Claims, 3 Drawing Sheets

GAUGE TYPE TIME AND TEMPERATURE INTEGRATING INDICATOR DEVICE

FIELD OF THE INVENTION

This invention relates in general to devices for indicating integrated time and temperature exposures. In particular, this invention relates to such devices of a guage type which comprise at least two thermally sensitive image-forming areas of differing thermal sensitivity.

BACKGROUND OF THE INVENTION

It is frequently desirable to be able to provide an indication whether a product has been exposed to an undesirable time-temperature history which results in substantial degradation of the product, or to a correct time-temperature history which may be required during processing or use of the product. This applies, e.g., to perishables such as foods, pharmaceuticals, and photographic products, which generally have limited useful lifespans which may be significantly shortened by exposure to undesirably relative high temperatures for a specific time period during storage, distribution, or use. This also applies, e.g., to certain products such as canned goods and biomedical materials which may be required to be held at certain high temperatures for a specific time period, e.g. to guarantee sterilization.

The rate of degradation, or other change in a product, at a given temperature is typically product dependent, i.e. some types of products show a greater increase in the rate of change for a given temperature increase relative to other products. Accordingly, it would be desirable to be able to provide indicators for use with various products which supply a visual indication of cumulative thermal exposure in which the rate of providing the visual indication of cumulative thermal exposure can be approximately matched to the rate of cumulative change, such as degradation, of the specific product to be monitored.

A number of systems have been described for providing indicators useful in detecting whether a product has been exposed either to specific time-temperature combinations or simply to a particular temperature which results in substantial degradation. Representative systems are disclosed, e.g., in U.S. Pat. No. 3,999,946 (use of compositions containing at least two conjugated acetylene groups which exhibit sequences of irreversible color changes at combinations of times and temperatures specific to each composition) and WO 96/28714 (use of viscoelastic material which migrates into a diffusely light-reflective porous matrix at a rate which varies with temperature to progressively change the light transmissivity of the porous matrix). A drawback of many of the indicators described in the prior art, however, is that they may frequently be useful only over a very limited temperature range, that they may not be easily designed to match the rate of cumulative change desired to be monitored for a particular product, that they may be bulky or expensive, that they may require cumbersome manual activation steps, that they may depend upon diffusion or complex reaction mechanisms for their operation, and that they may not effectively monitor and provide an ongoing record of thermal exposure prior to reaching a state of complete degradation, or other monitored property change, in an associated product.

PROBLEM TO BE SOLVED BY THE INVENTION

Accordingly, it would be desirable to provide time-temperature indicators which undergo readily detectable changes which correspond to the progressive development of time-temperature exposure history, which may be applied to expanded temperature ranges, which may be easily designed to match the rate of cumulative change desired to be monitored for a particular product, and which may effectively monitor and provide an ongoing record of thermal exposure prior to reaching a state of complete degradation, or other monitored property change, in an associated product. It would be especially desirable to provide such indicators in a non-bulky and inexpensive format, and which can be easily manufactured to match various rates of time-temperature dependent cumulative changes desired to be monitored for various products.

SUMMARY OF THE INVENTION

In accordance with one embodiment of the invention, a time and temperature integrating device for providing a visually observable indication of cumulative thermal exposure is disclosed comprising (a) at least two thermally sensitive image-forming areas of differing thermal sensitivity, and (b) indicating indicia in association with the thermally sensitive areas for indicating when each thermally sensitive area of the device has been exposed to predetermined cumulative thermal exposures.

DESCRIPTION OF THE PREFERRED EMBODIMENTS

Figure 1:
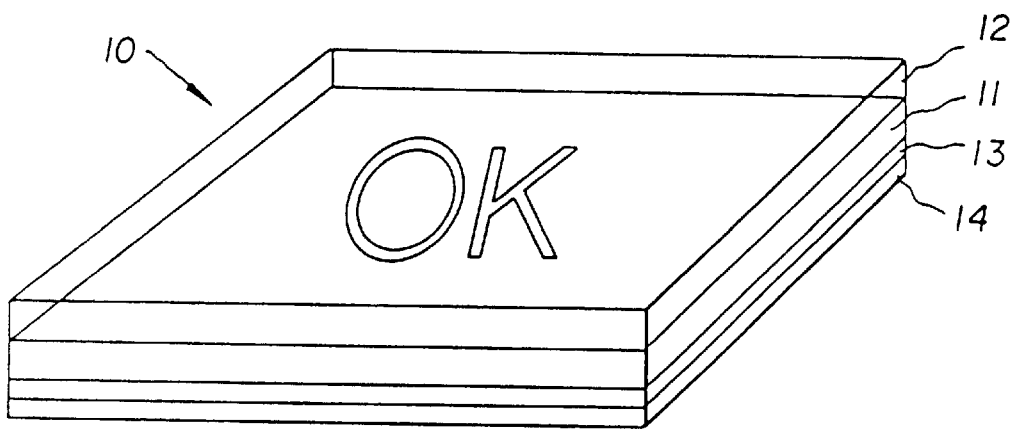
FIG. 1 illustrates an area of a time and temperature integrating indicator device in accordance with one embodiment of the invention.

Time and temperature integrating devices in accordance with the invention comprise at least two thermally sensitive image-forming areas of differing thermal sensitivity. One of such areas may be designed to indicate a state of complete degradation, or other monitored property change, in an associated product, while additional areas thereof may be designed to indicate whether selected intermediate levels of the property change of the product desired to be monitored. By incorporating multiple areas of differing thermal sensitivity in a single time and temperature integrating device, the device may thus be designed to more easily and effectively monitor and provide an ongoing record of thermal exposure. This allows a user to more easily and more accurately determine, e.g., the amount of thermal exposure a particular product may have already received, and the level of additional thermal exposure that the product can endure before quality would be unacceptably effected. The devices in accordance with the invention are distinguished from temperature indicating devices which comprise multiple elements which signal simply whether particular temperatures have been reached, but do not indicate cummulative thermal exposures below such particular temperatures.

The thermally sensitive image-forming areas of the devices in accordance with the invention may comprise any compositions previously suggested for use in time and temperature integrating devices. Such compositions may exhibit density and/or color changes as previously described in the art. Preferably, the thermally sensitive image-forming areas comprise thermally sensitive compositions which may be coated in a thin layer on a substrate, or absorbed into a substrate, such as, e.g., acetylenic compound compositions as described in U.S. Pat. No. 3,999,946. Most preferably, the thermally sensitive image-forming areas comprise a combination of (i) an organic silver salt oxidizing agent and (ii) a reducing agent for the organic silver salt oxidizing agent, as described in co-pending, commonly assigned, concurrently filed U.S. patent application Ser. No. 08/987,662 (Kodak Docket No. 76870AJA), the disclosure of which is incorporated by reference herein. Such compositions comprising materials typically used in thermographic and photothermographic imaging elements have been found to be particularly suitable for use in the instant invention as they may be designed to provide various differing rates of time-temperature dependent cumulative changes which may be desired to be monitored for various products, and as they can be easily manufactured in a non-bulky and inexpensive format.

The at least two thermally sensitive image-forming areas of different thermal sensitivity may be formed from areas having the same composition by pre-exposing one of the areas to a controlled level of thermal exposure so as to require less subsequent thermal exposure than at least one other thermally sensitive image-forming area of the device to form an image of the same density. Alternatively, the at least two thermally sensitive image forming areas of differing thermal sensitivity may comprise different chemical formulations which exhibit different thermal sensitivities and accordingly require different levels of cummulative thermal exposure to exhibit a comparable image change.

In accordance with a particular embodiment, each image-forming area of differing thermal sensitivity of the time and temperature integrating indicator devices of the invention may be in the form of transparent thermally sensitive compositions on a support printed with indicia representative of the condition of a particular product in association with various levels of thermal exposure. Indicating indicia for use with time and temperature integrating devices in accordance with the invention may comprise, e.g., letters or graphics printed on the device which become obscured by images formed in each image-forming area when the device has been exposed to a sufficient cumulative thermal exposure.

Figure 2A:
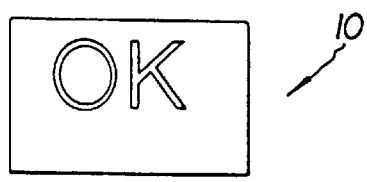
FIG. 2a represents an area of an indicator device in "fresh" state, having been exposed to no "high temperature" exposure.
Figure 2B:
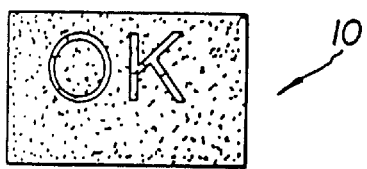
FIGS. 2b–2d represent the same area upon "high temperature" exposures for progressively extended periods of time.
Figure 2C:
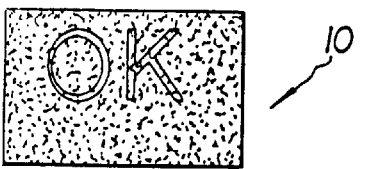
Figure 2D:
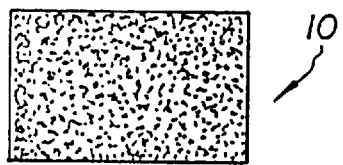

In accordance with one embodiment, each image-forming area may be in the form of time and temperature integrating indicator device 10 created by coating a support 11 printed with indicia such as "GOOD", "FRESH", or "OK" with a transparent thermally sensitive composition layer 12 as indicated in FIG. 1. In accordance with such embodiment, as the image-forming area is exposed to sufficiently high temperatures over sufficient periods of time, the thermally sensitive composition begins to darken, obscuring the indicia as illustrated in FIGS. 2a–2d. FIG. 2a represents an image-forming area of a device in "fresh" state, having been exposed to no "high temperature" exposure, while FIGS. 2b–2d represent the same area upon "high temperature" exposures for progressively extended periods of time. Where multiple areas having differing thermal sensitivity are included in a single indicator device in accordance with the invention, as the device is exposed to sufficiently high temperatures over sufficient periods of time, the compositions of the various areas begin to darken at different rates, obscuring the indicia at different levels of cummulative thermal exposure. The changes in visual density may be correlated to known time and temperature integrated exposures, thus providing an indication of the time and temperature history of a perishable product to which the device has been attached. Alternatively, thermally sensitive compositions may be coated on or otherwise attached to a transparent support, and the device directly overlaid and attached to a surface with printed indicia, such as the surface of a perishable product or packaging thereof. The thermally sensitive compositions may alternatively be imagewise printed on a support to form latent indicia, which becomes visible, or changes color or density level, only upon sufficient thermal exposure to form a message such as "NO GOOD" or "HEAT DAMAGED". In accordance with a further embodiment of the invention, the change in color or density level of each area of a time and temperature indicating device in accordance with the invention may be correlated to indicia in the form of reference colors and/or density levels associated with predetermined levels of thermal exposure. In another embodiment, a time and temperature indicator comprising multiple areas of differing sensitivity may be used in association with indicating indicia in the form of bar codes, such that excessive thermal exposure of a particular area results in obscuring a bar code associated therewith so as to render it unreadable by a bar code reader. Such obscured bar code reader may then function to provide an indication as to which level that the product to which the device has been attached has been heat damaged, or if it has been excessively damaged and should be replaced prior to purchase or use.

Figure 3A:
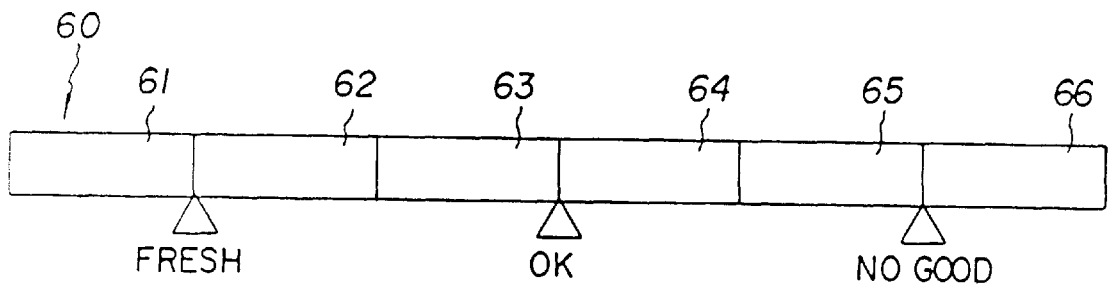
FIG. 3a represents an indicator device comprising areas of differing thermal sensitivity in "fresh" state, having been exposed to no "high temperature" exposure.
Figure 3B:
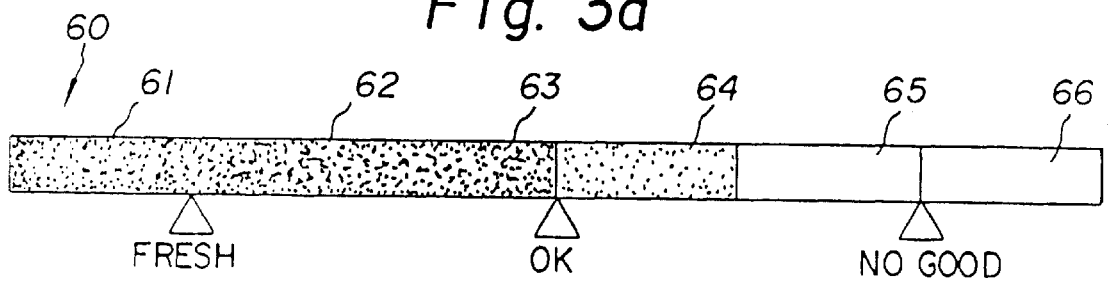
FIGS. 3b–3d represent the same device upon "high temperature" exposures for progressively extended periods of time.
Figure 3C:
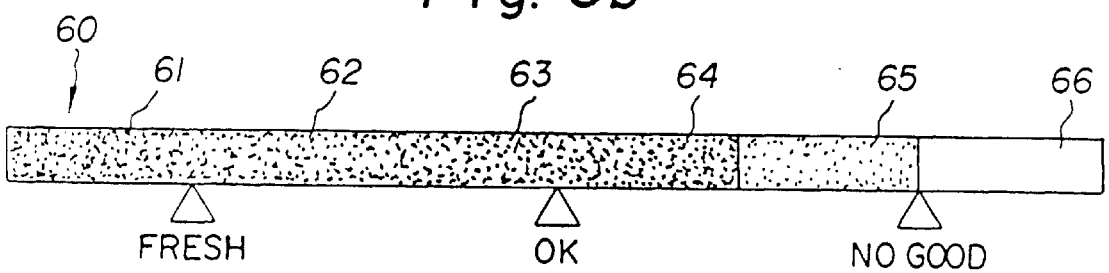
Figure 3D:
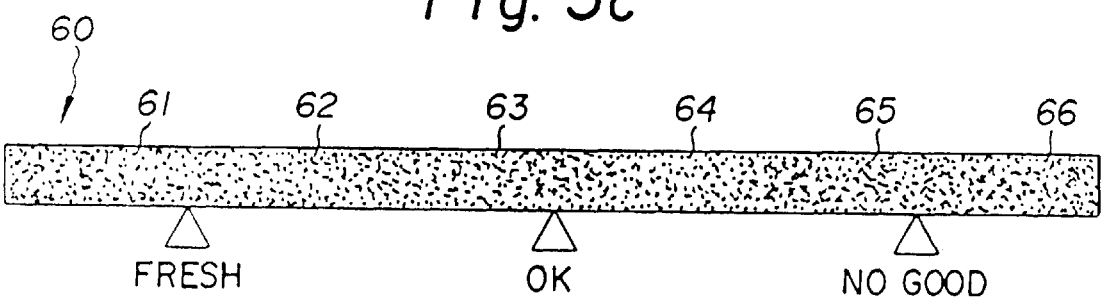

Time and temperature integrating indicator devices in accordance with the invention preferably comprise at least three thermally sensitive image-forming areas of different thermal sensitivity, and more preferably at least four thermally sensitive image-forming areas of different thermal sensitivity, in order to provide detailed monitoring capability. As illustrated in FIGS. 3a–3d, the areas of differing thermal sensitivity may be aligned in an indicator device to form a band 60 which progressively changes from one color or density level to another along the length of the band with increasing thermal exposure. FIG. 3a represents a device comprising areas 61 through 66 of differing thermal sensitivity in "fresh" state, having been exposed to no "high temperature" exposure, while FIGS. 3b–3d represent the same device upon "high temperature" exposures for extended periods of time. Markers adjacent to the thermally sensitive areas of the devices in accordance with the invention may provide status information for monitoring the ongoing record of themal exposure of an associated product, such as "FRESH", "OK", and "NO GOOD". This would allow a user to judge the cummulative amount of thermal exposure that a product has been exposed to relative to the quality of the product. In accordance with a particular embodiment of the invention, differential pre-heating of areas of a thermally sensitive composition along a device strip may be achieved by contact with multiple temperature controlled heat sources that are set at incrementally varying temperatures and which are shaped and positioned to generate a desired pre-heat pattern. Linear array thermal printing heads which are conventionally used in fax machines and thermal dye sublimation printers, e.g., may be programmed to generate fine heat differentials on the order of 300 different temperatures per inch. This technique produces a cummulative thermal exposure indicator that exibits numerous very fine areas which have been pre-exposed to very fine incremental changes in cumulative heat.

Figure 4A:
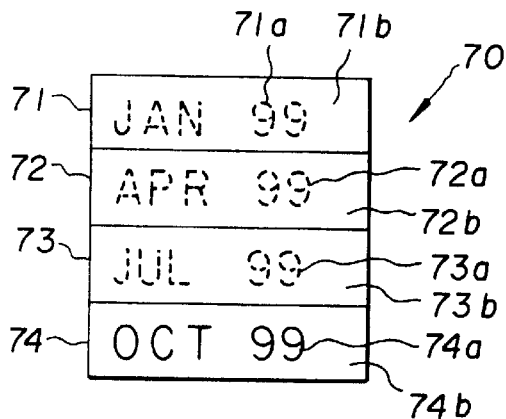
FIG. 4a represents an indicator device comprising latent indicia portions of differing thermal sensitivity in "fresh" state, having been exposed to no "high temperature" exposure.
Figure 4B:
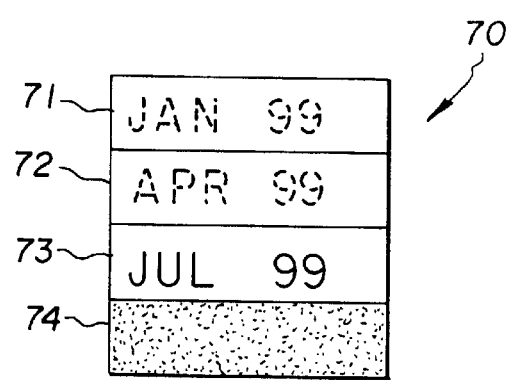
FIGS. 4b–4d represent the same device upon "high temperature" exposures for progressively extended periods of time.
Figure 4C:
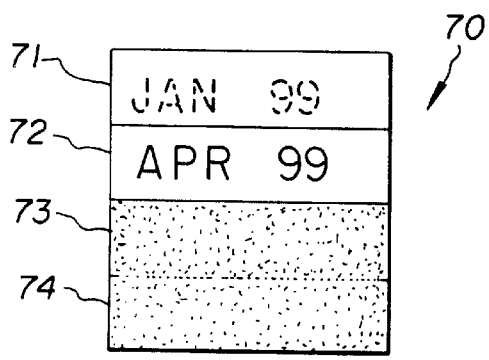
Figure 4D:
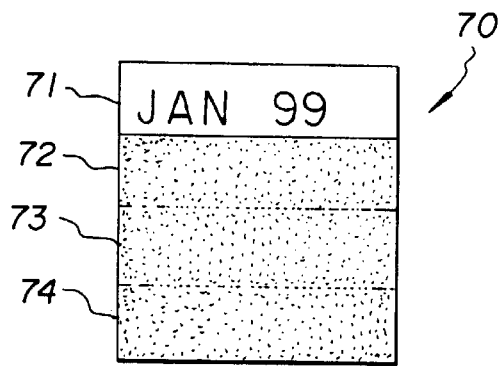

In accordance with a particular embodiment, image-forming areas of devices in accordance with the invention may comprise thermally sensitive latent indicia forming areas and surrounding thermally sensitive areas for obscurring the indicia once formed as illustrated, e.g., in FIGS. 4a–4d. Devices comprising such areas may be particularly useful for monitoring of the thermal exposure of an associated product to provide an indication of the date before which the product should be used, which date may be dependent upon the level of thermal exposure to which the product has been subjected. FIG. 4a illustrates a device 70 prior to thermal exposure sufficient to obscur any indicia thereof, while FIGS. 4b through 4d illustrate the device after increasing levels of thermal exposure. As shown in FIG. 4a, such a device may comprise image forming areas 71 through 74 of generally increasing thermal sensitivity. Each area comprises an indicia portion 71a through 74a, and a surrounding portion 71b through 74b. Portions 71a through 73a preferably comprise text or image in the form of printed latent indicia which becomes visible, or changes color or density level, only upon sufficient thermal exposure. Portion 74a in area 74 of highest sensitivity preferably comprises printed indicia which is clearly visible on the thermal sensitive material without the need for thermal exposure, in order to represent a maximum useful life regardless of the extent of thermal exposure, but may alternatively comprise latent indicia similarly as in portions 71a through 73a if desired. Surrounding portions 72b through 74b comprise thermally sensitive compositions which obscur the indicia portions 72a through 74b upon sufficient thermal exposure. Surrounding portion 71b of the area 71 of lowest sensitivity is preferably never darkened during the thermal exposure (or only when extreme thermal exposure is applied) so that the text or image indicia 71a corresponding to the lowest sensitivity is always visible once formed, as shown in FIG. 4d. The indicia and surrounding portions of areas 72 and 73 are sensitive to a different cumulative amount of thermal exposure. In addition, the cumulative thermal sensitivity of the indicia portion of one area is preferably the same or equivalent to the surrounding portion of one other area having the indicia portion of the imediate lower cumulative amount of thermal sensitivity (e.g., the cummulative thermal sensitivities of indicia portions 71a, 72a and 73a are the same or equivalent to those of surrounding portions 72b, 73b and 74b, respectively). Thus, when the cumulative thermal exposure corresponding to the sensitivity of a particular indicia portion is reached, the indicia in this area becomes clearly visible and, at the same time, the surrounding portion of the area containing the text or image having the imediate higher sensitivity is darkened so that the text or image of this specific area becomes unreadable, as shown in FIGS. 4b through 4d. By using such a sequence only one text or image is clearly visible at a time, which enhances the overall readibility of the thermal sensitive indicator. While indicating device 70 illustrated in FIGS. 4a through 4d comprises four image areas of differing thermal sensitivity and indicia in the form of text, devices in accordance with the described embodiment may comprise fewer or greater number of areas, and may employ indicia in the form of other types of images.

The time and temperature integrating devices in accordance with the invention can comprise a variety of supports on which thermally sensitive compositions may be coated. Examples of useful supports include opaque or transparent poly(vinylacetal) film, polystyrene film, poly (ethyleneterephthalate) film, poly(ethylene naphthalate) film, polycarbonate film, and related films and resinous materials, as well as paper, glass, metal, and other supports that withstand the intended thermal exposure temperature ranges desired to be monitored for a particular product. The use of opaque or reflective supports may be advantageous in that even very slight density and/or color changes in the thermally sensitive compositions may be more easily noticed. Even density changes as small as 0.05 units, e.g., may be sufficient to demonstrate a visually noticeable change with a reflective support.

Adhesive backing layers or overcoats may be used for removably or permanently attaching a time and temperature integrating device to a desired product or packaging. Conventional adhesive techniques may be used, including those typically used in the label and decalcomania arts. The use of a pressure-sensitive adhesive layer 13 with an associated release layer 14 as illustrated in FIG. 1, is particularly applicable, as such materials are capable of exerting a strong adhesive force toward a variety of surfaces without requiring activation by heat. Pressure-sensitive adhesives include, e.g., polyesters, natural rubber, styrene butadiene rubber, polyisobutylene, ethylene-vinyl acetate copolymers, acrylics, vinyl acetate copolymers, silicone polymers, poly (vinyl alkyl ethers), and other materials, as described, e.g., in "Encyclopedia of Polymer Science and Engineering", vol 13, pg 345–368 and vol 8, pg 617–646, John Wiley & Sons, New York (1985), and Kir-Othmer "Encyclopedia of Chemical Technology", Jacqueline I. Kirschwitz (Editor), Vol 1, pg 459–461, John Wiley & Sons, NY (1991).

The time and temperature integrating devices in accordance with a preferred embodiment of the invention comprise a support having thereon thermally sensitive image-forming areas comprising a combination of (i) an organic silver salt oxidizing agent and (ii) a reducing agent for the organic silver salt oxidizing agent. Such thermally sensitive compositions may comprise components of thermally sensitive compositions typically used in conventional thermally processable imaging elements. Such imaging elements, including films and papers, for producing images by thermal processing are well known. These elements include thermographic elements in which an image is formed by imagewise heating the element, as well as photothermographic elements in which an image is formed by imagewise exposure of the element to light followed by development by uniformly heating the element. Such imaging elements are described in, for example, *Research Disclosure*, June 1978, Item No. 17029 and U.S. Pat. Nos. 3,080,254, 3,457,075 and 3,933,508. *Research Disclosure* is published by Kenneth Mason Publications, Ltd., Dudley House, 12 North St., Emsworth, Hampshire P010 7DQ, England. The thermographic and photothermographic elements typically comprise essentially transparent thermally sensitive silver salt compositions coated on a support, which compositions form a visible image of increasing density with increasing thermal exposure.

While the thermal sensitivity of thermographic and photothermographic compositions is well known, it has not been previously suggested to use such compositions in association with indicating indicia in a time and temperature integrating indicator device. To the contrary, photothermographic imaging elements are typically heated at relatively high temperatures for relatively short periods of time to reach maximum density after an imagewise exposure (e.g., temperature within the range of about 90° C. to 180° C. for about 0.5 to about 60 seconds). At lower temperatures, the time required for complete image development may be extended for weeks or months or even longer, depending upon the reactivity of the thermographic or photothermographic composition. The use of the thermographic and photothermographic formulations as the thermally sensitive compositions in accordance with preferred embodiments of the instant invention takes advantage of the ability to control the reactivity of such formulations in order to correlate such reactivity to the known time and temperature sensitivity of a given perishable product. Such compositions may be formulated to demonstrate ranges of visible density increases corresponding to relatively longer periods of exposures at relatively lower temperatures than previously used for development in a conventional thermographic or photothermographic imaging element. By varying the composition of adjacent thermally sensitive image-forming areas, indicator devices in accordance with the invention may be obtained which exhibit varying threshold thermal exposures for a particular density and/or color change, so as to more clearly signal at what stage along a product's ultimate allowable range of thermal exposure the product is at.

As used herein, the term "perishable product" refers to foodstuffs, pharmaceuticals, photographic films, magnetic recording materials, chemicals, and the like, which products may be sensitive to exposure to specific temperatures over specific time periods. In accordance with the invention, the thermally sensitive areas may be designed to exhibit specific density changes corresponding to specific time and temperature integrated exposures correlated to the specific sensitivities of a particular perishable product. Indicator devices in accordance with the invention are particularly suitable for use with silver halide based light sensitive photographic films, which typically demonstrate undesirable degradation upon excessive time and temperature integrated exposures.

In one specific preferred embodiment, a time and temperature integrating indicator device in accordance with the invention is used to provide an indication of the cumulative thermal exposure to which a silver halide based photographic material has been subjected. Such photographic material may be, e.g., color negative, color positive, or color reversal films and papers or black and white films and papers. The indicator device may be conveniently applied to a conventional film cartridge, such as a 35 mm or an Advanced Photo System film cartridge as disclosed in copending, commonly assigned, concurrently filed U.S. application Ser. No. 08/987,787 (Kodak Docket No. 76872), the entire disclosure of which is incorporated by reference herein, or to packaging of any of the various types of photographic materials, including packaging of single use cameras (also referred to as "film with lens"). The use of releasably attached time and temperature integrating devices are particularly applicable for use with photographic materials which typically may be packaged in multiple enclosures, as disclosed in copending, commonly assigned, concurrently filed U.S. application Ser. No. 08/987,561 (Kodak Docket No. 76871), the entire disclosure of which is incorporated by reference herein. In such instance, a time and temperature integrating device may be attached to a photographic material packaging enclosure, and the thermal history of a particular photographic material unit may be easily monitored by distributors and consumers prior to purchase thereof. The user may subsequently transfer the indicator device to a photographic camera after the packaging enclosure is opened and the photographic material is loaded in a camera to continue monitoring thermal exposure during use of the photographic material. When the photographic material is subsequently unloaded from the camera, the indicator device may be retransferred to an enclosure for the material to maintain the thermal exposure record up to photographic processing. Indicator devices in accordance with the invention comprising multiple areas of differing sensitivity may be designed to provide information as to different levels of cummulative heat exposure which may be critical at different stages of distribution and use of the photographic material.

The thermally sensitive compositions used in the time and temperature integrating devices of the invention in accordance with a preferred embodiment comprises an oxidation-reduction image forming combination that contains an organic silver salt oxidizing agent, preferably a silver salt of a long chain fatty acid. Such organic silver salts themselves are resistant to darkening upon illumination. Preferred organic silver salt oxidizing agents are silver salts of long chain fatty acids containing 10 to 30 carbon atoms. Examples of useful organic silver salt oxidizing agents are silver behenate, silver stearate, silver oleate, silver laurate, silver hydroxystearate, silver caprate, silver myristate, and silver palmitate. Combinations of organic silver salt oxidizing agents are also useful. Examples of useful organic silver salt oxidizing agents that are not organic silver salts of fatty acids are silver benzoate and silver benzotriazole.

A variety of reducing agents are useful in the thermally sensitive composition. Examples of useful reducing agents include substituted phenols and naphthols, such as bis-beta-naphthols; polyhydroxybenzenes, such as hydroquinones, pyrogallols and catechols; aminophenols, such as 2,4-diaminophenols and methylaminophenols; ascorbic acid reducing agents, such as ascorbic acid, ascorbic acid ketals and other ascorbic acid derivatives; hydroxylamine reducing agents; 3-pyrazolidone reducing agents, such as 1-phenyl-3-pyrazolidone and 4-methyl-4-hydroxymethyl-1-phenyl-3-pyrazolidone; and sulfonamidophenols and other organic reducing agents known to be useful in thermographic and photothermographic elements, such as described in U.S. Pat. No. 3,933,508, U.S. Pat. No. 3,801,321 and *Research Disclosure*, June 1978, Item No. 17029. Combinations of organic reducing agents are also useful in the thermally sensitive composition.

Preferred organic reducing agents are sulfonamidophenol reducing agents, such as described in U.S. Pat. No. 3,801,321. Examples of useful sulfonamidophenol reducing agents are 2,6-dichloro-4-benzenesulfonamidophenol; benzenesulfonamidophenol; and 2,6-dibromo-4-benzenesulfonamidophenol, and combinations thereof.

In accordance with a preferred embodiment of the invention, the thermally sensitive image-forming areas of the time and temperature integrating devices comprise at least one layer containing in reactive association in a binder, preferably a binder comprising hydroxyl groups, a light-sensitive photographic silver halide prepared in situ and/or ex situ in combination with the organic silver salt oxidizing agent and the reducing agent for the organic silver salt oxidizing agent. Such image-forming compositions are typically used in photothermographic imaging elements as described in the above cited thermographic imaging element references. References describing such components in the context of photothermographic imaging elements include, for example, U.S. Pat. Nos. 3,457,075; 4,459,350; 4,264,725 and 4,741,992 and *Research Disclosure*, June 1978, Item No. 17029.

In photothermographic materials it is believed that the latent image silver from the silver halide acts as a catalyst for the described image-forming combination upon thermal exposure. In the time and temperature integrating devices of the invention, photosensitive silver salts may be included to activate or optimize the thermal sensitivity of the device to a particular temperature range for a given application. In one particular embodiment of the invention, a photosensitive silver salt may be used to activate the time and temperature integrating device upon exposure to light. In such embodiment, the thermally sensitive composition of the device may be maintained in a light-tight environment, e.g. through use of a removable opaque overcoat layer, until the device is attached to a perishable product, at which point the device would be exposed to light to fog the photosensitive silver salts and thereby activate the device.

In the case of the time and temperature integrating devices in accordance with the invention which comprise photothermographic compositions which are activated by exposure to light, forms of energy to which the photographic silver halides may be sensitive include ultraviolet, visible and infrared regions of the electromagnetic spectrum as well as electron beam and beta radiation, gamma ray, x-ray, alpha particle, neutron radiation and other forms of corpuscular wave-like radiant energy in either non-coherent (random phase) or coherent (in phase) forms produced by lasers. Exposures may be monochromatic, orthochromatic, or panchromatic depending upon the spectral sensitization of the photographic silver halide. Exposure is preferably for a time and intensity sufficient to fog the composition by producing a developable latent image in the photosensitive silver salts. Spectral sesitizing dyes may be used to provide sensitivity to a particular region of the elecomagnetic spectrum, but in general are not necessary for use in thermally sensitive photothermographic compositions which may be used in accordance with the devices of the invention.

A preferred concentration of photographic silver halide for use in the thermally sensitive areas of the time and temperature integrating devices in accordance with preferred embodiments of the invention is within the range of 0.01 to 10 moles of photographic silver halide per mole of organic silver salt oxidizing agent (e.g., silver behenate) in the photothermographic material. Other photosensitive silver salts are useful in combination with the photographic silver halide if desired. Preferred photographic silver halides are silver chloride, silver bromide, silver bromochloride, silver bromoiodide, silver chlorobromoiodide, and mixtures of these silver halides. Very fine grain photographic silver halide is especially useful. The photographic silver halide can be prepared by any of the known procedures in the photographic art. Such procedures for forming photographic silver halides and forms of photographic silver halides are described in, for example, *Research Disclosure*, December 1978, Item No. 17029 and *Research Disclosure*, June 1978, Item No. 17643. Tabular grain photosensitive silver halide is also useful, as described in, for example, U.S. Pat. No. 4,435,499. The photographic silver halide can be unwashed or washed, chemically sensitized, protected against the formation of fog, and stabilized against the loss of sensitivity during keeping as described in the above Research Disclosure publications. The silver halides can be prepared in situ as described in, for example, U.S. Pat. No. 4,457,075, or prepared ex situ by methods known in the photographic art.

In accordance with the invention, the thermally sensitive compositions are designed to show progressive, predetermined changes in visual image density corresponding to increased integrated time and temperature exposures. Optimum concentrations of the organic silver salt oxidizing agent and of the reducing agent in thermally sensitive compositions will vary depending upon the desired image density, particular organic silver salt oxidizing agent, particular reducing agent and particular time-temperature sensitivity desired to be achieved. Total silver metal coverages of from about 0.1 to 10 $g/m^2$ may typically be used in the thermally sensitive image forming compositions used in the indicator devices of the invention, but coverages of at least about 1.0 $g/m^2$, and more preferably at least about 2.0 $g/m^2$, are desirable to form images with preferably high densities for the indicator devices of the invention. In general, such components will desirably be present at higher levels than traditionally employed for conventional thermally processed imaging elements, as coverages of less than 2.0 $g/m^2$ total silver are typiclly used in conventional thermographic and photothermogaphic imaging elements in order to prevent excessive non-image fogging.

The thermally sensitive areas of the time and temperature integrating devices as described preferably contain various colloids and polymers alone or in combination as vehicles and binders and in various layers. Useful materials are hydrophilic or hydrophobic. They are transparent or translucent and include both naturally occurring substances, such as gelatin, gelatin derivatives, cellulose derivatives, polysaccharides, such as dextran, gum arabic and the like; and synthetic polymeric substances, such as water-soluble polyvinyl compounds like poly(vinyl alcohols), poly (vinylpyrrolidone) and acrylamide polymers. Other synthetic polymeric compounds that are useful include dispersed vinyl compounds such as in latex form and particularly those that increase dimensional stability of photographic elements. Effective polymers include water insoluble polymers of acrylates, such as alkylacrylates and methacrylates, acrylic acid, sulfoacrylates, and those that have cross-linking sites. Preferred high molecular weight materials and resins include poly(vinyl butyral), cellulose acetate butyrate, poly(methylmethacrylate), poly (vinylpyrrolidone), ethyl cellulose, polystyrene, poly (vinylchloride), chlorinated rubbers, polyisobutylene, butadiene-styrene copolymers, copolymers of vinyl chloride and vinyl acetate, copolymers of vinylidene chloride and vinyl acetate, poly(vinyl alcohol) and polycarbonates.

The thermally sensitive compositions as described can contain further addenda that are known to aid in formation of a useful image. Photothermographic and thermographic compositions, e.g., can contain development modifiers that function as speed increasing compounds, sensitizing dyes, hardeners, antistatic agents, plasticizers and lubricants, coating aids, brighteners, absorbing and filter dyes, such as described in *Research Disclosure*, December 1978, Item No. 17643 and *Research Disclosure*, June 1978, Item No. 17029. The components of the thermally sensitive composition can be in any location in the time and temperature integrating device that provides the desired visible density changes. If desired, one or more of the components can be in one or more layers of the element. For example, in some cases, it is desirable to include certain percentages of the reducing agent, toner, stabilizer and/or other addenda in an overcoat layer over a photothermographic imaging layer of the element. This, in some cases, reduces migration of certain addenda in the layers of the element. It is necessary, however, that the components of the thermally sensitive imaging composition be "in association" with each other in order to produce the desired visible image density change. The term "in association" herein means that the components are in a location with respect to each other that enables the desired visible density change to be observed upon sufficient thermal exposure. The layers of the time and temperature integrating device may be coated on a support by coating procedures known in the photographic art, including dip coating, air knife coating, curtain coating or extrusion coating using hoppers. If desired, two or more layers may be coated simultaneously.

Photothermographic imaging elements of the prior art are typically manufactured to minimize fogging of the silver halide contained therein, while obtaining adequate photographic speed, so as to minimize non-imagewise density development. Time and temperature integrating devices in accordance with the instant invention, on the other hand, will generally not be subject to such anti-fogging requirements. To the contrary, in accordance with particular embodiments of the invention, chemical sensitizing agents may be included to optimize photosensitivity of silver halide grains incorporated in photothermographic compositions to optimize the catalytic effect of the silver halide grains on the thermal sensitivity of the composition, and complete fogging may be desired to activate the photothermographic composition to be thermally responsive to a particular temperature range. Thermal stabilizers may also be included, however, to optimize the response range of a thermally sensitive composition to a desired range for a particular application. Thermal stabilizers may also provide improved stability of the element during storage prior to use with a perishable product. Representative thermal stabilizers which may be used for such purposes include 2-bromo-2-arylsulfonylacetamides, such as 2-bromo-2-p-tolysulfonylacetamide; 2(tribromomethyl sulfonyl) benzothiazole; and 6-substituted-2,4-bis(tribromomethyl)s-triazines, such as 6-methyl or 6-phenyl-2,4-bis (tribromomethyl)-s-triazine.

In accordance with a particular embodiment, photothermographic compositions incorporating photosensitive silver halide grains which have been chemically sensitized with a gold sensitizer are used in the thermally sensitive areas of the time and temperature integrating devices of the invention, such as described, e.g., in copending, commonly assigned U.S. patent application Ser. No. 08/883,924 of Eshelman et al., filed Jun. 27, 1997, the disclosure of which is incorporated by reference herein. Such gold sensitized photothermographic compositions have been found to be more sensitive, and more easily fogged in the absence of antifogging agents, than conventional photothermographic compositions, and accordingly more applicable to use in accordance with the instant invention. Gold sensitizers may be effective at very low levels, e.g. as low as 0.1 mg/m$^2$, and levels of up to about 8.0 mg/m$^2$ are preferred to provide optimum sensitivity.

The thermally sensitive compositions used in the indicator devices of the invention may also comprise a toning agent, also known as an activator-toner or toner-accelerator. Such materials may advantageously perform as development accelerators, and may be included at various levels to optimize desired responses for particular applications. Combinations of toning agents are also useful. Examples of useful toning agents and toning agent combinations are described in, for example, *Research Disclosure*, June 1978, Item No. 17029 and U.S. Pat. No. 4,123,282. Examples of useful toning agents include, for example, phthalimide, N-hydroxyphthalimide, N-potassium-phthalimide, succinimide, N-hydroxy-1,8-naphthalimide, phthalazine, 1-(2H)-phthalazinone and 2-acetylphthalazinone.

Post-processing image stabilizers and latent image keeping stabilizers are typically useful in photothermographic imaging elements. While generally not necessary for use in the instant invention, such materials may be used to control responses where desired for a particular application. Any of the stabilizers known in the photothermographic art may be useful for the described photothermographic elements. Illustrative examples of useful stabilizers include photolytically active stabilizers and stabilizer precursors as described in, for example, U.S. Pat. No. 4,459,350. Other examples of useful stabilizers include azole thioethers and blocked azolinethione stabilizer precursors and carbamoyl stabilizer precursors, such as described in U.S. Pat. No. 3,877,940.

While photothermographic imaging elements are typically heated at relatively high temperatures for relatively short periods of time after an imagewise exposure until a developed image is formed (e.g., temperature within the range of about 90° C. to 180° C. for about 0.5 to about 60 seconds), the use of thermally sensitive thermographic and photother-mographic composition in accordance preferred embodiments of the instant invention will typically be formulated to demonstrate ranges of visible density increases corresponding to relatively longer periods of exposures, and typically at relatively lower temperatures, such as for periods of minutes, hours, days, weeks, or even months at temperatures ranging from about −40° C. to about 160° C. Elements may also be formulated to exhibit density change responses outside this range if desired. It is an advantage of the invention that thermally sensitive compositions employed in accordance with the indicator devices of the invention may be conveniently designed to exhibit a density change profile corresponding to specific time and temperature integrated exposures desired to be monitored for a particular perishable product.

A wide variety of materials can be used to prepare a backing layer that is compatible with elements comprising thermally sensitive compositions. The backing layer should not adversely affect sensitometric characteristics of the photothermographic element in accordance with certain embodiments of the invention such as minimum density, maximum density and photographic speed. Useful backing layers include those comprised of poly(silicic acid) and a water-soluble hydroxyl containing monomer or polymer that is compatible with poly(silicic acid) as described in U.S. Pat. No. 4,828,971. A combination of poly(silicic acid) and poly(vinyl alcohol) is particularly useful. Other useful backing layers include those formed from polymethylmethacrylate, acrylamide polymers, cellulose acetate, crosslinked polyvinyl alcohol, terpolymers of acrylonitrile, vinylidene chloride, and 2-(methacryloyloxy) ethyltrimethylammonium methosulfate, crosslinked gelatin, polyesters and polyurethanes. Particularly preferred backing layers are described in above-mentioned U.S. Pat. Nos. 5,310,640 and 5,547,821, the entire disclosures of which are incorporated herein by reference. Backing layers are preferably transparent and may contain organic or inorganic matte particles. The matte particles are preferrably beads of poly(methylmethacrylate-coethyleneglycoldimethacrylate) with a particle size of 3 to 5 micrometers at a coverage of 25 mg/m . An electroconductive layer may also be included, and may preferably comprise a colloidal gel of silver-doped vanadium pentoxide dispersed in a polymeric binder. An electroconductive backing layer may also be used comprising a polymeric binder, matte particles and electrically-conductive metal-containing particles dispersed in said binder in an amount sufficient to provide a surface resistivity of less than $5 \times 10^{11}$ ohms/square.

Time and temperature integrating devices in accordance with the invention may include a protective layer coated over the thermally sensitive composition. Such an overcoat layer may perform several important functions, such as control of humidity of the thermally sensitive composition. The visible density change responses of thermographic and photothermographic compositions due to cummulative thermal exposure as described above are generally dependent upon the relative humidity to which such compositions are exposed. The humidity dependency of the device response may be eliminated by enclosing the thermally sensitive composition in a controlled humidity enviroment, such as through use of a water impermeable support and protective overcoat layer, or by enclosing the device in an otherwise sealed container. Advantageously, the relative humidity may be controlled to provide specific time and temperature density response curves optimized to match the known time and temperature exposure response of a specific product. Alternatively, where humidity exposure is also a factor in the deterioration of a particular product which is desired to be monitored, cummulative time, temperature and humidity integrated exposures may be monitored with indicator devices in accordance with the invention where the thermally sensitive composition is left exposed to the relative humidity in which it is used.

Protective overcoats may be composed of hydrophilic colloids such as gelatin or poly(vinyl alcohol) but are preferably composed of poly(silicic acid) and a water-soluble hydroxyl-containing monomer or polymer as described in U.S. Pat. No. 4,741,992, issued May 3, 1988. Protective overcoats may also be provided in the form of pressure sensitive laminated films. Alternatively, two elements comprising thermally sensitive compositions coated on supports, at least one of which is transparent, may be laminated together to form a device comprising the thermally sensitive compositions sealed between the supports, or a single element comprising a transparent support may be folded and laminated to seal the thermally sensitive composition between the folded support.

Devices in accordance with the invention which comprise photothermographic compositions may contain a removable pressure sensitive adhesive attached opaque overcoat, or otherwise be packaged in a light-impermeable enclosure, so as to prevent fogging of the light sensitive silver salt contained therein prior to use of the device. The device may then be simply activated by removal of the overcoat or enclosure and exposure to ambient light (or other activating means) prior to being applied to a perishable item or packaging thereof. While the photothermographic composition may still be somewhat sensitive to excessive thermal exposures even prior to being exposed to light, as the exposed silver halide acts as a catalyst, the device prior to exposure may be much more stable in storage.

Co-pending, commonly assigned, concurrently filed U.S. patent application Ser. No. 081/987,662 (Kodak Docket No. 76870AJA) incorporated by reference above contains examples of elements comprising various thermally sensitive image-forming compositions coated on supports which may be particularly suitable for use in time and temperature integrating devices comprising multiple areas of differing thermal sensitivity. As demonstrated in the Examples therein, distinct formulations employed in indicator devices may used to obtain substantially different levels of thermal sensitivity.

The invention has been described in detail, with particular reference to certain preferred embodiments thereof, but it should be understood that variations and modifications can be effected within the spirit and scope of the invention.

What is claimed is:

1. A time and temperature integrating device for providing a visually observable indication of various ranges of cumulative thermal exposure comprising
    (a) at least two thermally sensitive image-forming areas of differing cumulative thermal exposure sensitivity, and
    (b) indicating indicia in association with the thermally sensitive areas for indicating when each thermally sensitive area of the device has been exposed to predetermined cumulative thermal exposure;
wherein the at least two thermally sensitive areas of different thermal sensitivity comprise different chemical formulations.

2. A device according to claim 1, comprising at least three thermally sensitive image-forming areas of different thermal sensitivity.

3. A device according to claim 1, comprising at least four thermally sensitive image-forming areas of different thermal sensitivity.

4. A device according to claim 1, wherein the image-forming areas comprise an indicating indicia portion and a surrounding portion, and the indicia portion of at least a first image forming area comprises thermally sensitive latent indicating indica which is not visually observable until the device has been exposed to a predetermined thermal exposure.

5. A device according to claim 4, wherein the cumulative thermal sensitivity of the latent indicating indicia of the first image-forming area is the same or equivalent to the surrounding portion of a second image-forming area, wherein the surrounding portion of the second image-forming area obscurs the indicating indicia of the second area upon sufficient thermal exposure to make the latent indicating indicia of the first area visible.

6. A device according to claim 1, wherein the thermally sensitive image-forming areas each comprise a combination of (i) an organic silver salt oxidizing agent and (ii) a reducing agent for the organic silver salt oxidizing agent.

7. A device according to claim 6, comprising at least three thermally sensitive image-forming areas of different thermal sensitivity.

8. A device according to claim 6, comprising at least four thermally sensitive image-forming areas of different thermal sensitivity.

9. A device according to claim 6, wherein the image-forming areas comprise an indicating indicia portion and a surrounding portion, and the indicia portion of at least a first image forming area comprises thermally sensitive latent indicating indicia which is not visually observable until the device has been exposed to a predetermined thermal exposure.

10. A device according to claim 9, wherein the cumulative thermal sensitivity of the latent indicating indicia of the first image-forming area is the same or equivalent to the surrounding portion of a second image-forming area, wherein the surrounding portion of the second image-forming area obscurs the indicating indicia of the second area upon sufficient thermal exposure to make the latent indicating indicia of the first area visible.

11. A time and temperature integrating device for providing a visually observable idication of various ranges of cumulative thermal exposure comprising
    (a) at least two thermally sensitive image-forming areas of differing cumulative thermal exposure sensitivity, and
    (b) indicating indicia in association with the thermally sensitive areas for indicating when each thermally sensitive area of the device has been exposed to predetermined cumulative thermal exposures.

wherein at least one of the at least two thermally sensitive areas of differing thermal sensitivity has been pre-exposed to a controlled level of thermal exposure so as to require less subsequent thermal exposure that at least one other thermally sensitive area of the device to form an image.

12. A device according to claim 11, wherein the at least two thermally sensitive areas of different thermal sensitivity comprise the same chemical formulations.

13. A device according to claim 11, wherein the thermally sensitive image-forming areas of different thermal sensitivity comprise areas differentially pre-heated by contact with multiple temperature controlled heat sources set at incrementally varying temperatures which are shaped and positioned to generate a desired pre-heat pattern.

14. A device according to claim 13, wherein the thermally sensitive areas of different thermal sensitivity comprise areas differentially pre-heated with a linear array thermal printing head.

15. A device according to claim 11, wherein the image-forming areas comprise an indicating indicia portion and a surrounding portion, and the indicia portion of at least a first image forming area comprises thermally sensitive latent indicating indicia which is not visually observable until the device has been exposed to a predetermined thermal exposure.

16. A device according to claim 15, wherein the cumulative thermal sensitivity of the latent indicating indicia of the first image-forming area is the same or equivalent to the surrounding portion of a second image-forming area, wherein the surrounding portion of the second image-forming area obscures the indicating indicia of the second area upon sufficient thermal exposure to make the latent indicating indicia of the first area visible.

17. A device according to claim 11, wherein the thermally sensitive image-forming areas each comprise a combination of (i) an organic silver salt oxidizing agent and (ii) a reducing agent for the organic silver salt oxidizing agent.

18. A device according to claim 17, wherein the at least two thermally sensitive areas of different thermal sensitivity comprise the same chemical formulations.

19. A device according to claim 17, wherein the thermally sensitive image-forming areas of different thermal sensitivity comprise areas differentially pre-heated by contact with multiple temperature controlled heat sources set at incrementally varying temperatures which are shaped and positioned to generate a desired pre-heat pattern.

20. A device according to claim 19, wherein the thermally sensitive areas of different thermal sensitivity comprise areas differentially pre-heated with a linear array thermal printing head.

* * * * *